Nov. 2, 1965 C. L. STEC 3,215,078
CONTROLLED VOLUME PIEZOELECTRIC PUMPS
Filed Aug. 31, 1964

INVENTOR.
CHARLES L. STEC
BY [signature]
[signature]
ATTYS.

3,215,078
Patented Nov. 2, 1965

3,215,078

CONTROLLED VOLUME PIEZOELECTRIC PUMPS

Charles L. Stec, 2725 N. Nelson St., Arlington, Va.

Filed Aug. 31, 1964, Ser. No. 393,450
14 Claims. (Cl. 103—1)
(Granted under Title 35, U.S. Code (1952), sec. 266)

The invention described herein may be manufactured and used by or for the Government of the United States of America for governmental purposes without the payment of any royalties thereon or therefor.

The present invention relates to a piezoelectric pump for a fluid and more particularly to a piezoelectric pump containing an insert for increasing the pumping efficiency.

The majority of the prior art pumps rely for their operation upon a plurality of mechanically moving elements that, by their nature, create a great deal of noise and are therefore objectionable on a submarine or other ships where it is desired to maintain as low a noise level as possible. Accordingly, there has been a long felt need for a pump that is substantially free of mechanically moving parts and is silent in operation. Pursuant to a solution of the aforementioned noise problem, the instant silent pump has been invented as an improvement over applicant's copending application Ser. No. 219,361, filed Aug. 17, 1962, Patent No. 3,150,592.

This invention utilizes the properties of certain piezoelectric materials to provide the pumping, or volume changing element of the pump.

Very briefly as disclosed in applicant's copending application a pair of cylindrical piezoelectric crystals are concentrically mounted forming the walls of a cavity. However, it has heretofore been very difficult to obtain a pair of their concentric piezoelectric crystals having close tolerances in their dimensions. Therefore, it has been very difficult to control the exact volume enclosed by the concentric cylinders. Accordingly, it has been very difficult to obtain two or more completed pumping units having the same pumping characteristics.

The present invention overcomes this difficulty by utilizing the concentric piezoelectric crystals as a mold for casting a nonadhering plastic insert. Since the plastic insert completely fills the enclosed cavity between the cylindrical piezoelectric crystals the size of the cavity utilized for pumping will be solely dependent on the deformation of the piezoelectric crystal.

An object of the present invention is to provide a piezoelectric pump which is capable of efficiently pumping gaseous fluids.

Another object of the invention is to provide a piezoelectric pump having concentric piezoelectric members which do not require close tolerances in their dimensions.

A further object of the invention is to provide a piezoelectric pump containing a plastic insert.

Still another object of the invention is to provide a means for controlling the pumping volume between a pair of concentric piezoelectric crystals.

A still further object of the invention is to provide a means for controlling the pumping volume enclosed within a piezoelectric crystal.

Other objects and many of the attendant advantages of this invention will be readily appreciated as the same becomes better understood by reference to the following detailed description when considered in connection with the accompanying drawings wherein.

Figure 1:
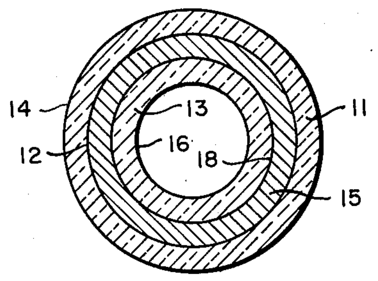
FIG. 1 is a sectional view of one embodiment of a piezoelectric pump constructed in accordance with the invention.
Figure 2:
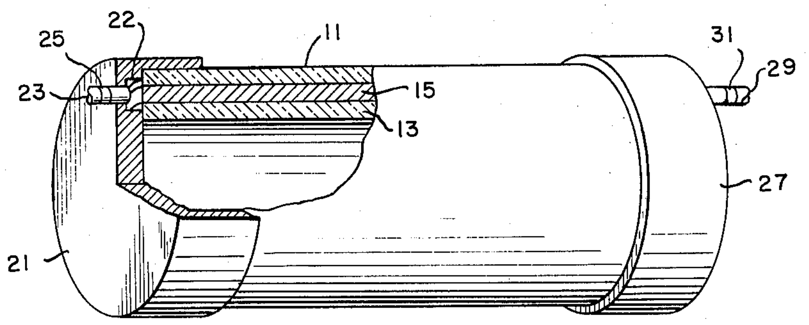
FIG. 2 is a partially broken away view of the piezoelectric pump shown in FIG. 1.

Referring to FIGS. 1 and 2 taken together, an outer cylindrical piezoelectric crystal 11 is provided with an inner coated electrode 12 and outer coated electrode 14 as is customary in the art. The cylindrical piezoelectric crystal 11 contains a second smaller cylindrical piezoelectric crystal 13 which is provided with an inner coated electrode 16 and outer coated electrode 18. The cylindrical piezoelectric crystals 11 and 13 are of the circumference expander type and operate in the radial mode when they are driven by a pulsating direct current signal or an A.C. signal. The space between the cylindrical piezoelectric crystals 11 and 13 is filled by a suitable plastic insert 15.

In the making of the pump the cylindrical piezoelectric crystals 11 and 13 are used as a mold for casting the plastic insert 15. The respective surfaces of the crystals 11 and 13 are coated with a thin layer of a suitable parting compound which prevents the plastic insert from adhering to the crystals 11 and 13. The plastic insert may be any suitable plastic which is substantially noncompressible. Suitable plastics for use in the invention are polyethylene, organopolysiloxane resins or substituted siloxane resins. Organopolysiloxane resins and substituted siloxane resins are sold by Owens-Illinois Glass Company under the trade name of "Glass Resins" and are described in "Glass Resins" published by Owens-Illinois Technical Center, 1700 N. Westwood, Toledo 7, Ohio, copyright in 1963. The outer electrode 18 on the cylindrical piezoelectric crystal 13 is electrically connected to the inner electrode 12 of the cylindrical piezoelectric crystal 11 and the inner electrode 16 of the cylindrical piezoelectric crystal 13 is electrically connected to the outer electrode 14 of cylindrical piezoelectric crystal 11.

A first end cap 21 is connected to one end of the outer cylindrical piezoelectric crystal 11 in a fluid tight relationship.

The inner cylindrical piezoelectric crystal 13 is mounted in a fluid tight relationship against the end cap 21. The end cap 21 contains a circular groove which forms a passageway 22. This passageway 22 is a little wider than the plastic insert in order to permit fluid to flow between the cylindrical piezoelectric crystals and the plastic insert. The end cap 21 contains an input pipe 23 connected to the passageway 22. A valve 25 is mounted in the input pipe 23. A second end cap 27 containing a passageway 28 is connected in a fluid tight relationship to the other end of crystals 11 and 13. The end cap 27 contains an output pipe 29 connected to the passageway 28. The output line 29 contains a valve 31 for controlling the fluid flow.

The pumping unit illustrated in FIGS. 1 and 2 operates as follows: a pulsating direct current signal is applied simultaneously to the electrodes of the crystals 11 and 13 to cause the inner cylindrical piezoelectric crystal 13 to contract radially and the outer cylindrical piezoelectric crystal to expand radially, creating a vacuum on the rising portion of the pulse. The fluid enters the pumping unit by flowing through the valve 25 and through the intake pipe 23. On the descending portion of the pulse the inner cylindrical piezoelectric crystal 13 expands radially and the outer cylindrical piezoelectric crystal simultaneously contracts radially forcing the fluid to leave the pumping unit through output pipe 29 and through valve 31.

Figure 3:
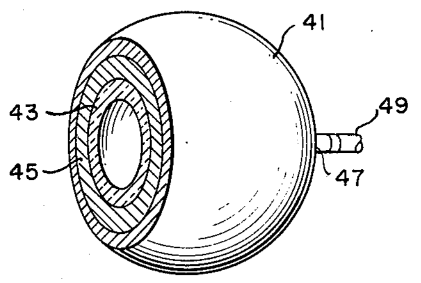
FIG. 3 is a view, partially in section and partially broken away of another embodiment of the instant invention.

FIG. 3 illustrates a spherical embodiment of the invention; a first spherical piezoelectric crystal 41 contains a second concentrically mounted spherical piezoelectric crystal 43.

A plastic insert 45 similar to the plastic insert 15 of FIG. 1 is molded within the space provided between the spherical piezoelectric crystals 41 and 43. A hole 47 is provided in the spherical crystal 41 to permit an input pipe 49 to be connected to the unit. A hole is provided at this point in the plastic insert 45 to permit the fluid to flow between the crystal 43 and plastic insert 45 during the pumping cycle.

An output pipe which is not shown is provided on the other side of the sphere in a similar manner to the input pipe 49. The pump illustrated in FIG. 3 pumps fluids in a similar fashion to the pumps illustrated in FIGS. 1 and 2.

Figure 4:
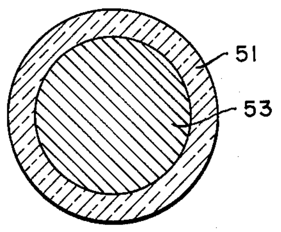
FIG. 4 is a sectional view of an alternate embodiment of a piezoelectric pump constructed in accordance with the invention.

FIG. 4 illustrates an embodiment of a pumping unit containing a single pumping piezoelectric crystal 51 in which a solid plastic insert 53 is cast occupying the entire cavity. In all other respects the unit is similar to FIGS. 1 and 2, if it is of cylindrical or to FIG. 3 if it is spherical. The pumping action of the embodiment illustrated in FIG. 4 is obtained by the crystal 53 expanding and contracting in response to an A.C. signal.

It is emphasized that all the pumping units illustrated in FIGS. 1, 2, 3, and 4 are capable of efficiently pumping gases as well as liquids because the only cavities within the pumping unit are created by the displacemnt of the piezoelectric crystals and the fluid communicating passages between the valves. Additionally the volumes enclosed by the fluid communicating passages is small compared to the total displacement of the piezoeletcric crystals. The volume of the communicating passages can be accurately controlled specifically by way of example; the unit may have a displacement volume which is 10 times as large as the volume contained by the fluid communicating passages.

Obviously many modifications and variations of the present invention are possible in the light of the above teachings. It is therefore to be understood that within the scope of the appended claims the invention may be practiced otherwise than as specifically described.

What is claimed is:

1. A pump comprising:

a hollow electro-strictive body having a pumping surface; and a nonadhering plastic member in intimate contact with the pumping surface of said electro-strictive body;

whereby a pumping chamber is formed between said plastic member and said electro-strictive body by the deformation of said electro-strictive body.

2. A pump comprising:

a hollow body having piezoelectric characteristics having an outer and inner surface;

a nonadhering plastic member, said plastic member being in intimate contact with said inner surface of said hollow body having piezoelectric characteristics;

means causing said body having piezoelectric characteristics to radially expand forming a pumping chamber and to contract, said last named means being coupled to said body containing piezoelectric characteristics;

one-way inlet means fluidly coupled to said pumping chamber for supplying a fluid to be pumped when said body having piezoelectric characteristics expands radially; and one-way outlet means fluidly coupled to said pumping chamber for receiving said fluid when said body having piezoelecrtic characteristics contracts radially.

3. A pump comprising:

a pair of concentric bodies;

a first of said bodies having piezoelectric characteristics;

said second body being a nonadhering plastic body in intimate contact with said first body having piezoelectric characterisics;

a pumping chamber formed by the expansion of said body have piezoelectric characteristics;

one-way fluid inlet means coupled to and fluid outlet means coupled from said pumping chamber;

said first body having piezoelectric characteristics having a pair of electrodes; and means electrically connected to said electrodes for causing said piezoelectric body to alternately and repeatedly expand and contract.

4. A silent pump comprising:

a pair of concentric piezoelectric bodies;

a nonadhering plastic body;

said nonadhering plastic body having its outer surface in intimate contact with the inner surface of said first piezoelectric body and said nonadhering plastic body having its inner surface in intimate contact with the outer surface of said second piezoelectric body; and each of said piezoelectric bodies having an electrode means on its inner and outer surfaces;

whereby a pair of pumping chambers are formed by the expansion of one and contraction of the other of said pair of concentric piezoelectric bodies.

5. A pump as defined in claim 4 wherein said bodies are geometrically similar.

6. A pump as defined in claim 4 but further characterized by having means for applying a varying voltage to said piezoelectric bodies connected to said inner and outer electrodes, for alternately and repeatedly causing said piezoelectric bodies to expand and contract.

7. A pump comprising:

a plurality of concentric bodies;

a first and second of said bodies being of electrically-polarized piezoelectric material;

a third of said bodies being of a different material, and in intimate contact with a surface of each of said first and second bodies whereby a pair of pumping chambers are formed by the expansion and contraction of said first and second bodies; and one-way fluid inlet means coupled to and fluid outlet means coupled from said pump chambers; and means to apply a varying voltage to said first and second bodies to cause said bodies to alternately expand and contract.

8. A pump as defined in claim 7 wherein said third body is rigid and non-piezoelectric.

9. A pump as set forth in claim 7 wherein said piezoelectric bodies are concentric spheres.

10. A pump as set forth in claim 7 wherein said piezoelectric bodies are concentric cylinders.

11. A gas pump comprising:

a pair of concentric bodies;

a first of said bodies being non-piezoelectric and rigid;

said second body being an electrically-polarized piezoelectric body having an inner and outer surface, said inner surface being in intimate contact with said first body, said piezoelectric body having an electrode, a said inner surface and an electrode on said outer surface, whereby said piezoelectric body expands to form a pumping chamber;

a one-way gas inlet to a one-way gas outlet from said pump chamber; and means connected to the electrodes for applying a varying electrical charge to said faces to cause said piezoelectric body to expand and contract whereby gas is alternately drawn into said chamber and ejected therefrom.

12. A method of assembling a piezoelectric gas pumping unit comprising the steps of:

coating the inside surface of a hollow piezoelectric crystal with a parting compound;

casting a plastic insert inside of said hollow piezoelectric crystal; and curing said plastic insert.

13. A method of assembling a piezoelectric gas pumping unit comprising the steps of:

coating the inside surface of a first hollow piezoelectric body with a parting compound;

coating the outside surface of a second smaller hollow piezoelectric body with a parting compound; substantially concentrically aligning said smaller piezoelectric body within said larger piezoelectric body; and casting a plastic insert between the inner piezoelectric body and the outer piezoelectric body.

14. A method of assembling a piezoelectric pumping unit comprising the steps of:

coating the inside surface of a first hollow piezoelectric body with a parting compound;

coating the outside surface of a second smaller hollow piezoelectric body with a parting compound;

placing said smaller piezoelectric body within said larger piezoelectric body; and casting a plastic insert between the inner piezoelectric body and the outer piezoelectric body.

References Cited by the Applicant

UNITED STATES PATENTS

| | | |
|---|---|---|
| 2,086,891 | 7/37 | Bachmann et al. |
| 2,317,166 | 4/43 | Abrams. |
| 2,565,158 | 8/51 | Williams. |
| 2,928,409 | 3/60 | Johnson et al. |
| 2,939,970 | 6/60 | Dranetz et al. |

LAURENCE V. EFNER, *Primary Examiner.*